US008606236B2

(12) United States Patent
Chow et al.

(10) Patent No.: US 8,606,236 B2
(45) Date of Patent: *Dec. 10, 2013

(54) AUTOMATIC WIRELESS SERVICE ACTIVATION IN A PRIVATE LOCAL WIRELESS SERVICE

(75) Inventors: Albert T. Chow, Hillsdale, NJ (US); Richard Henry Erving, Piscataway, NJ (US); Robert Raymond Miller, II, Township of Morris, Morris County, NJ (US); Christopher W Rice, Morris, NJ (US); Jesse Eugene Russell, Piscataway, NJ (US); Wenchu Ying, Cedar Knolls, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 378 days.

This patent is subject to a terminal disclaimer.

(21) Appl. No.: 12/987,937

(22) Filed: Jan. 10, 2011

(65) Prior Publication Data

US 2011/0202976 A1 Aug. 18, 2011

Related U.S. Application Data

(63) Continuation of application No. 11/504,932, filed on Aug. 16, 2006, now Pat. No. 7,869,791, which is a continuation of application No. 10/657,542, filed on Sep. 8, 2003, now Pat. No. 7,103,347, which is a continuation of application No. 09/612,802, filed on Jul. 10, 2000, now Pat. No. 6,643,504.

(51) Int. Cl.
*H04M 1/66* (2006.01)

(52) U.S. Cl.
USPC ............ 455/411; 455/410; 455/443; 455/515

(58) Field of Classification Search
USPC ................ 455/411, 3.01, 410, 443, 515, 552, 455/553.1, 63, 426.1, 428; 709/230; 726/4, 726/6; 370/328, 338
See application file for complete search history.

(56) References Cited

U.S. PATENT DOCUMENTS

| | | |
|---|---|---|
| 5,088,090 A | 2/1992 | Yacoby |
| 5,214,646 A | 5/1993 | Yacoby |
| 5,448,619 A | 9/1995 | Evans et al. |
| 5,452,471 A * | 9/1995 | Leopold et al. ............... 455/429 |
| 5,732,360 A | 3/1998 | Jarett et al. |
| 5,915,219 A | 6/1999 | Poyhonen |
| 5,920,818 A | 7/1999 | Frodigh et al. |
| 5,924,030 A | 7/1999 | Rautiola et al. |
| 5,960,365 A | 9/1999 | Leih et al. |
| 6,011,960 A | 1/2000 | Yamada et al. |
| 6,052,595 A | 4/2000 | Schellinger et al. |
| 6,219,539 B1 | 4/2001 | Basu et al. |
| 6,243,572 B1 | 6/2001 | Chow et al. |

(Continued)

*Primary Examiner* — Tan Trinh

(57) ABSTRACT

A secondary Ethernet-like wireless communication system overlapped by a dominant Ethernet-like wireless communication system, and including radio access and communication for activation, association, and authentication of a wireless device in the secondary Ethernet-like wireless communication system. An automated private service activation (APSA) port is used for accepting access and communication requests of a wireless device seeking activation, association and authentication in the secondary Ethernet-like wireless communication system. The APSA port provides an access and communication channel for radiating signals at a level exceeding a signal level of the access and communication channel only within limited spatial constraints. In addition the APSA port provides space for receiving the wireless device for activation and communication in the secondary Ethernet-like wireless communication system.

20 Claims, 4 Drawing Sheets

(56) References Cited

U.S. PATENT DOCUMENTS

| | | |
|---|---|---|
| 6,418,313 B1 | 7/2002 | Wallstedt |
| 6,421,328 B1 | 7/2002 | Larribeau et al. |
| 6,434,399 B1 | 8/2002 | Kamperschroer |
| 6,470,179 B1 | 10/2002 | Chow et al. |
| 6,493,550 B1 | 12/2002 | Raith |
| 6,643,504 B1 | 11/2003 | Chow et al. |
| 6,826,414 B1 | 11/2004 | Reynolds et al. |
| 7,103,347 B2 | 9/2006 | Chow et al. |
| 7,869,791 B1 | 1/2011 | Chow et al. |
| 2004/0054799 A1 | 3/2004 | Meier et al. |
| 2007/0058693 A1* | 3/2007 | Aytur et al. .......... 375/130 |

* cited by examiner

AUTOMATIC WIRELESS SERVICE ACTIVATION IN A PRIVATE LOCAL WIRELESS SERVICE

CROSS REFERENCE TO RELATED APPLICATIONS

This application is a continuation of U.S. patent application Ser. No. 11/504,932, filed Aug. 16, 2006 now U.S. Pat. No. 7,869,791, entitled, "AUTOMATIC WIRELESS SERVICE ACTIVATION IN A PRIVATE LOCAL WIRELESS SERVICE" which is currently allowed and is a continuation of U.S. patent application Ser. No. 10/657,542 filed on Sep. 8, 2003 (now U.S. Pat. No. 7,103,347), entitled, "AUTOMATIC WIRELESS SERVICE ACTIVATION IN A PRIVATE LOCAL WIRELESS SERVICE", which is a continuation of U.S. patent application Ser. No. 09/612,802 filed on Jul. 10, 2000 (now U.S. Pat. No. 6,643,504), entitled "AUTOMATIC WIRELESS SERVICE ACTIVATION IN A PRIVATE LOCAL WIRELESS SYSTEM" Each of the above applications is herein incorporated by reference in its entirety.

FIELD

The present embodiments relate generally to the problem of activating service for a wireless telephone or other device in an Ethernet-like wireless communication system other than the Ethernet-like wireless communication system for which the wireless device is in normal subscription with that can coexist with the dominant Ethernet-like wireless communication system. In a particular aspect it concerns activation of a wireless telephone or other device to operate in a local or secondary Ethernet-like wireless system, overlapped by a dominant or primary Ethernet-like wireless communication system. Activation in a private or secondary wireless system for a permanent or a limited-time duration is considered. The original embodiments specifically relates to a first time activation of digital wireless/mobile telephones, wherein the wireless system may be cellular, PCN, PCS, or a similar mobile radio system. The embodiment in herein extended to Ethernet and IP-based radio system.

BACKGROUND

A wireless Ethernet associated device typically needs to be activated before it can operate in particular Ethernet-like wireless communication system. Normally this process is required only since subsequent uses of the wireless device in that system is already authorized. Access in different systems is generally only based on agreements between different systems and access to databases to verify the legitimacy of the wireless device operating out of its home territory.

There are a large number of localized and/or private Ethernet-like wireless communication systems which are not part of contractual arrangements and may indeed operate within a territory already covered or overlaid by other carriers including the home carrier of a wireless device seeking use of a localized and/or private wireless system. Such localized and/or private wireless systems operate at low signal levels compared to outdoor macro cell systems. These localized and/or private systems are frequently found within buildings and on campus sites.

Service is granted by means of a Private System Identification (PSID) code entered into each wireless device requesting service from the private/local Ethernet-like wireless communication system. This PSID code is entered into the handset, which is requesting service. This process is cumbersome and time consuming.

There is a need for an automatic setup procedure, in part, is the ability of the wireless device to connect to a secondary Ethernet-like communication system.

At present there is no way of automatically provisioning a wireless device to a secondary wireless communication system in an area radiated by a more powerful dominant wireless communication system.

The present embodiments meet these needs.

SUMMARY

The present embodiments relate to a secondary Ethernet-like wireless communication system overlapped by a dominant Ethernet-like wireless communication system, and including radio access and communication for activation, association, and authentication of a wireless device in the secondary Ethernet-like wireless communication system. The secondary Ethernet-like wireless communication system includes an automated private service activation (APSA) port for accepting access and communication requests of a wireless device seeking activation, association and authentication in the secondary Ethernet-like wireless communication system. The APSA port provides an access and communication channel for radiating signals at a level exceeding a signal level of the access and communication channel only within limited spatial constraints; and providing space for receiving the wireless device for activation and communication in the secondary Ethernet-like wireless communication system.

The present embodiments additionally relate to a method of communication for achieving association, authentication and access, from a secondary Ethernet-like wireless communication system in a region overlapped by a dominant Ethernet-like wireless communication system. The embodiment creates access, association, and authentication in a signal space in which radiated access and communication signal levels of the secondary Ethernet-like wireless communication system within the signal space exceed access and communication signal levels of the dominant Ethernet-like wireless communication system. The embodiments additionally position a wireless device seeking access, association, and authentication and communication within the access and communication signal space and powering up the wireless device. The embodiment can search by the wireless device for the strongest channel. The embodiment can additionally select the channel of the secondary Ethernet-like wireless communication system by reason of positioning of the wireless device within the access and communication space. The embodiment finally authorizes, authenticates, and associates the wireless device for operation within the secondary Ethernet-like wireless communication system.

Yet another embodiment relates to activating and authenticating a wireless device of a new user in a secondary Ethernet-like wireless communication system in a region overlapped by a dominant Ethernet-like wireless communication system. The wireless device enables the activating and authenticating within a limited sub-region of the region overlapped by a dominant Ethernet-like wireless communication system and within that sub-region including the steps of: providing access credentials from an Automatic Private Service Activation (APSA) unit of the secondary Ethernet-like system; and interact with a database containing user credentials, user requested features, to provide a record and enable service to the new user.

An embodiment of a secondary Ethernet-like wireless communication system overlapped by a dominant Ethernet-like wireless communication system, and including radio access and communication for activation, association, and authentication of a wireless device in the secondary Ethernet-like wireless communication system. The secondary Ethernet-like wireless communication system can include an internet/intranet-connected database including user lists and user features and characteristics and access and communications to individuals requesting service in the secondary Ethernet-like wireless communication system. The system can allow the individuals to insert information concerning user credentials and access and communication information in advance of implementing access, association, and communication requests. The system additionally can include an automated private service activation (APSA) port for accepting the access, association, and communication requests of a wireless device seeking activation in the secondary Ethernet-like wireless communication system.

In another embodiment the activating, associating, and authenticating of a wireless device in a secondary Ethernet-like wireless communication system can be co-located with a primary Ethernet-like wireless communication system. The method of co-locating can include masking the signal strength associated with the primary Ethernet-like wireless communication system; and coupling signals of the secondary Ethernet-like wireless communication system to the wireless device during the masking.

An additional embodiment of accessing and achieving authentication from a secondary Ethernet-like wireless communication system in a region overlapped by a dominant Ethernet-like wireless communication system. The secondary Ethernet-like wireless communication system creates an access and communication signal space in which radiated access and communication signal levels of the secondary Ethernet-like wireless communication system within the access and communication signal space exceed access and communication signal levels of the dominant Ethernet-like wireless communication system. The system receives a wireless device seeking access and communication to the secondary Ethernet-like wireless communication system within the access and communication signal space; receiving a search from the wireless device for a strongest channel. The system selects the channel of the secondary Ethernet-like wireless communication system by reason of the proximity of the wireless device within the access and communication space; and authorizing and authenticating the wireless device for operation within the secondary Ethernet-like wireless communication system.

BRIEF DESCRIPTION OF THE DRAWINGS

The detailed description will be better understood in conjunction with the accompanying drawings as follows.

Figure 1:
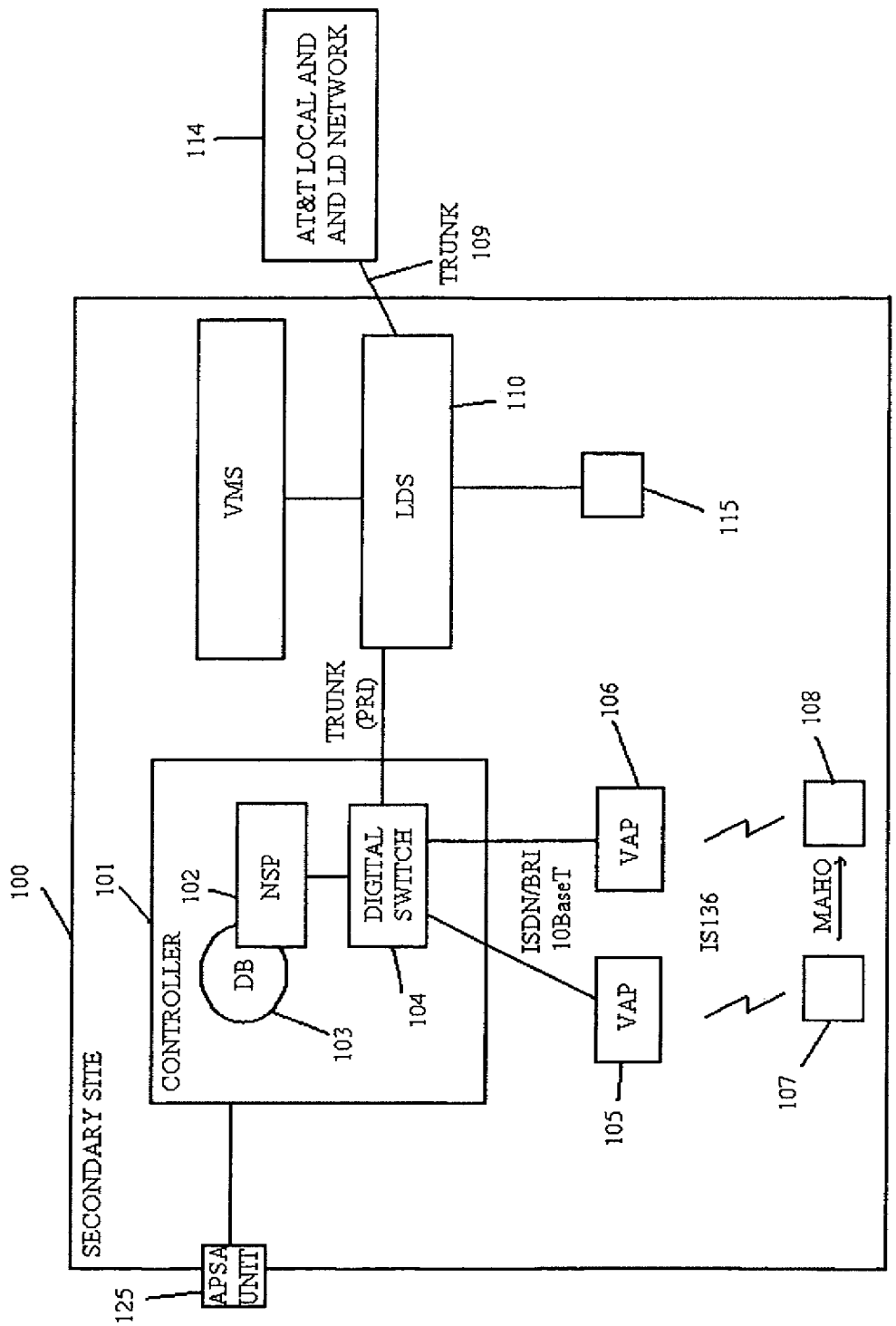
FIG. 1 is a block schematic of an illustrative service architecture of an Ethernet-like wireless communication system, which may be a secondary system subject to ambient control signal radiation of an overlapping dominant system.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments involve a secondary Ethernet-like wireless communication system overlapped by a dominant Ethernet-like wireless communication system, and includes radio access as well as communication for activation, association, and authentication of a wireless device in the secondary Ethernet-like wireless communication system.

More specifically the system includes an automated private service activation (APSA) port for accepting access and communication requests of the wireless device seeking activation, association and authentication in the secondary Ethernet-like wireless communication system. This APSA port provides an access and communication channel for radiating signals at a level exceeding a signal level of the access and communication channel within limited spatial constraints. The APSA port enables a space to exist, a geographical zone, for receiving the wireless device for activation and communication in the secondary Ethernet-like wireless communication system.

As an example, the secondary Ethernet-like wireless communication system can be an enterprise wireless LAN system and the dominant Ethernet-like wireless communication system can be a municipal system.

As used herein, the term "Ethernet-like" as the term is used herein means a packet network which is capable of handling an Internet protocol and whose packets usually include an origination address and a destination address. This term also may include networks which utilize header compression with fixed session endpoints (e.g. VoIP telephony) wherein originating and terminating addresses are implicit in over-the-air transmissions, and are re-inserted at a wired Ethernet gateway.

Radio access, in this embodiment means completion of a communication link between a client device and networked radio system using a common air interface, following application for service and presentation of appropriate credentials to enable that service.

To further explain the embodiments, the communication for activation, association and authentication of the wireless device in the secondary Ethernet-like wireless communication system means that a wireless device, such as a computer, personal data assistant, digital pager, wireless cell phone, or wireless LAN modem can perform the step of exchanging information with an APSA to achieve activation, and in doing so, enable association with the secondary Ethernet-like wireless communication network. Additionally, the wireless device can perform the step of presenting information entitling it to service as a prelude to authentication of the wireless device in the secondary Ethernet-like wireless communication system.

The following provides an example of this activation, association and authentication. For a specific wireless device, a public municipal wireless LAN is the dominant communication system, and a private enterprise wireless LAN is the secondary communication system. Having entered an enterprise premises from outdoors, a user turns on his/her device and locates it within an APSA enclosure or designated area. The wireless device receives the APSA signal and selects it preferentially (due to its high signal strength). It extracts system identification information (e.g. SSID) from the APSA signal, and transmits an association request to the APSA. This is the first step of obtaining service from a network that it does not primarily use. Next, is the authentication step. The wireless device performs the step of transmitting information regarding its identity (e.g. MAC address). It may also send, depending on the system implementation, other identification (e.g. access credentials enabling access to other radio systems) as well information needed to begin an encrypted session. The secondary network may then interact with one or more databases (which may contain access privileges for both the primary and secondary systems) to authenticate with the secondary system. The secondary system's database could be maintained by an employee of the enterprise (e.g. receptionist), and authentication could be allowed for a selected period of time (e.g. one day), or for certain levels of service (e.g. incoming telephone calls only). The credentials and subsequent authentication might also be used to charge the user's account for any outgoing calls to the primary system.

The APSA port is connected to the secondary wireless communication system via Ethernet (in an example embodiment). This APSA port can be part of a wireless LAN having digital communication channels which operates under the IEEE 802.11 standard or under the IEEE 802.16 standard. Those skilled in the art will recognize that other radio standards can also be used.

The APSA port acts as a base station or access point affiliated with the secondary system, and may have additional firewall, virus, or other protections against misuse. As with other base stations or access points that are members of the secondary network, it provides capability for devices to both enter the system and communicate using it. However, the APSA port illuminates only well-defined (usually small) area to minimize interception of signals beyond these limits and to produce high signal levels from the secondary network in the space with low transmitted power.

By radiating the signals, APSA port creates a space in which the radiating signals can be received by the wireless device. This is a 3-dimensional space that enables the wireless device to activate and communicate with the secondary system under controlled conditions. The wireless device then associates and communicates with the secondary Ethernet-like wireless communication system within that spatially limited zone.

In an embodiment, the secondary Ethernet-like wireless communication system can include a surface covering an antenna for abutting against and communicating with the wireless device forming a communication zone, at a signal level sufficient to achieve access, association, and authentication between the wireless device and the secondary Ethernet-like wireless communication system, while exceeding the signal level of the overlapping dominant Ethernet-like wireless communication system in the space abutting the wireless device. The term "abutting" in this context refers to placement of the device in close proximity to the APSA antenna (e.g. fractions of an inch to several inches).

In another embodiment, a surface covering an antenna for access and communication to a wireless device seeking access, association, and authentication can be used with the secondary Ethernet-like wireless communication system which provides shielding for blocking the signal level of the overlapping dominant Ethernet-like wireless communication system. RF shielding and absorbing materials for creating such an environment can be obtained from ETS-Lindgren and others, for example.

In still another embodiment, the secondary Ethernet-like wireless communication system may include a system controller for providing digital switching and service features connected to the APSA port via an Ethernet interface.

For example, this system controller can be a server available from IBM, Gateway, Dell, and others for use with a secondary Ethernet-like system, such as the private enterprise system when the dominant Ethernet like system is a public municipal wireless system. This controller can act as an authenticator, handoff coordinator, service agent (e.g. VoIP) etc. connected to the APSA port to the secondary Ethernet-like wireless system. The connection medium between the APSA, secondary Ethernet-like wireless system, and the server may be a wired Ethernet interface in an implementation.

In a similar embodiment, the secondary Ethernet-like wireless communication system can include with the digital controller a Network Service Platform (NSP) for providing specific service and management functions. An example of an NSP-enabled function would be automatic frequency and power assignment for a multi-access point network and a service example would be location-determination of clients based on the serving access point.

In still another embodiment, it is contemplated to include a method for communicating which achieves association, authentication and access for a wireless device using a secondary Ethernet-like wireless communication system in a region overlapped by a dominant Ethernet-like wireless communication system.

This method involves creating access, association, and authentication in a signal space formed from a plurality of signals which radiate access and communication from the secondary Ethernet-like wireless communication system forming a space with signals that exceed the access and communication signal levels of the dominant Ethernet-like wireless communication system.

This space of strong signals of the secondary Ethernet-like wireless system is formed by first positioning a wireless device that is seeking access, association, and authentication with the secondary Ethernet-like wireless system in the signal space and then powering up the wireless device. The wireless device is then used to search for the strongest channel within the signal space. Then of the multiple channels being presented in the signal space, the user and preferentially, or the wireless device can automatically, based on preset preferences, select a channel of the secondary Ethernet-like wireless communication system because the wireless device is positioned within the space which can be referred to as the access and communication space of the secondary Ethernet-like wireless system. After the channel is selected, authorization, authentication, and association of the wireless device within the secondary Ethernet-like wireless communication system can occur.

The wireless device can thereby link to a private network while being in the presence of a more-dominant network.

For example, a user, with a wireless personal digital assistant, like a Blackberry™ can walk into the front office of AT&T in San Antonio Tex. which has an exclusive private network. The receptionist at the AT&T office would ask the user, if he/she would like to have Internet access while in the AT&T building which has a private Ethernet-like wireless communication system, but the user can also access his own network from the same building.

In a usage example, a receptionist would take the user's wireless PDA, place it in a designated APSA enclosure, and then turn it on. The enclosure could be similar in appearance to a microwave oven. The private AT&T system would then request that the PDA transmit a device ID to begin the access, association and authentication process. Following the exchange, the device becomes an authorized user of the private indoor AT&T system while in the building. In this example, the private system would allow devices to communicate only with the secondary Ethernet-like wireless communication system, which in this example is the AT&T private indoor system.

In the above example, the "microwave-like" device might have no door (for convenience) and be of a dimension that comfortably sits on a desk, about 15 inches long, 12 inches deep and 8 inches high. The interior of the device would consist a 5-sided shielded box with an antenna which radiates an RF signal that can be used for authentication. Examples of such signals would be commonly-used unlicensed wireless LAN frequencies such as 2.4 GHz or 5 GHz, however other frequencies can be used as appropriate for the specific application, consistent with the frequencies employed by the primary and secondary access networks and associated client radios.

This embodiment contemplates that if an unwanted potential user tries to break into the secondary Ethernet-like system via the APSA, the potential unwanted user would be unable to use the system because the unwanted user's device is not communicating through the zone or space at the receptionist's desk. That is, the unwanted user device may be able to work outside (e.g. on the street) using the public wireless system, but not in the building because the device was not authenticated in the proper zone for new authentications. To give another example, an unwanted user may enter the building via another entrance (e.g. a loading dock), turn on his/her device, but can not log onto the indoor private system because he/she has not been authenticated via the APSA.

The method in an embodiment contemplates that the secondary Ethernet-like wireless communication system could also interwork with the dominant Ethernet-like wireless communication system's to authenticate a user of the secondary Ethernet-like wireless communication system for a limited set of services (e.g. Internet service only, or services from the primary Ethernet-like network only) without allowing access to the private intranet. Using such an arrangement, telephone calls from a dominant system, such as a public outdoor wireless Ethernet-like system, can still reach a user while indoors and connected to the secondary Ethernet-like wireless communication system. More specifically, an embodiment contemplates that calls from a public wireless phone system may be diverted to the wireless device which is in communication with the secondary Ethernet-like wireless communication system (by virtue of a notification message from the secondary system to the primary system) indicating that the user is now indoors and is associated with and authenticated on the secondary system.

An additional embodiment contemplates that authorizing, associating, and authenticating of the wireless device can be based on information retrieved from a database of the dominant Ethernet-like wireless communication system to enable billing of service usage while on the secondary Ethernet-like wireless communication system to occur through the account information based on the subscription that the user has with the dominant Ethernet-like wireless communication system.

For example, if a user with a wireless device connected to the secondary Ethernet-like wireless communication system wants to place an international call while connected to the secondary system, the user can make the call using the secondary system but be billed on the normal bill that the user has for the user's device with the dominant Ethernet-like communication system. In such a case, the user authenticates the wireless device under the dominant, public system, then goes indoors under the secondary, private system, with billing enabled back through the dominant, public system.

An embodiment of the method envisions that the authorizing, associating, and authenticating activates for a user to use his or her wireless device include using a WDI identifier code. WDI represents the phrase, wireless device identifier which is a specific number for that specific wireless device of the user. In this embodiment, the WDI code is inserted into the wireless device at initial authorization and authentication, wherein the WDI code is unique to the secondary Ethernet-like wireless system. After initial authorization and authentication the wireless device preferentially locks on to the secondary Ethernet-like wireless communication system using the WDI code.

To better explain this step, a user inserts a number, such as a Personal Identification Number (PIN), which is forwarded to the secondary Ethernet-like communication system. Then the system checks the PIN against a group of pre-identified users in a database of approved users. If the user is in the database and the PIN matches, then authentication occurs and connection to the system is fast, quick and secure. Those skilled in the art will recognize that various encryption and challenge-response schemes can be used to accomplish this function without incurring vulnerability to individuals who may wish to gain unauthorized access.

In still another embodiment of the method the wireless device can be operated in the secondary Ethernet-like wireless system in substitution for the dominant Ethernet-like wireless communication system. That is, the user, can enter the AT&T building, be authorized for access and communication with the secondary communication system and operate on the AT&T private network in substitution for another carrier, like T-Mobile. In such a circumstance the T-Mobile account could allow either public Wi-Fi access or cellular access (assuming a dual-mode cellular/Wi-Fi device. Those skilled in the art will recognize that both homogeneous and heterogeneous air interfaces can be accommodated by the APSA system if corresponding dual or multi-mode devices are available. For example, IEEE 802.11 systems for both dominant and secondary access could be employed, or similarly IEEE 802.16 systems. Likewise, dual-mode devices could accommodate an 802.16 dominant system (in one spectral band), and an 802.11 system (in another band). The APSA port can be part of a cellular base station having digital communication channels which operate under the IEEE standards.

Another version of the method of the embodiments contemplate activating and authenticating a wireless device of a new user in a secondary Ethernet-like wireless communication system in a region overlapped by a dominant Ethernet-like wireless communication system which involves enabling the activating and authenticating of the new user device within a limited sub-region, that is the microwave-like device of the receptionist, in the building, wherein the private AT&T system overlaps a dominant Ethernet-like wireless communication system, like T-Mobile and within that sub-region, the microwave like box, providing access credentials from an Automatic Private Service Activation (APSA) unit of the secondary Ethernet-like system to provide a record and enable service to the new user. More particularly, in this embodiment, the APSA unit interacts with a database connected to the secondary Ethernet-like wireless network containing all user credentials including new user credentials, as well as user service preferences and feature sets.

Another embodiment of the method contemplates that the wireless device can have installed on it, a private system identification number (PSID) enabling the secondary system to recognize the wireless device by the PSID code. An example of a usable PSID would be an Ethernet address for the wireless device.

Another version of an embodiment can include a secondary Ethernet-like wireless communication system overlapped by a dominant Ethernet-like wireless communication system, that includes radio access and communication for activation, association, and authentication of a wireless device in the secondary Ethernet-like wireless communication system having an internet/intranet-connected database including user lists and user features and characteristics for access and communications to individuals requesting service in the secondary Ethernet-like wireless communication system and allowing the individuals to insert information concerning user credentials for access and communicating information in advance of implementing access, association, and communication requests. The information is provided using an automated private service activation (APSA) port for accepting the access, association, and communication requests of a wireless device seeking activation in the secondary Ethernet-like wireless communication system.

This version of the embodiment enables the receptionist in the AT&T building, the secondary network to remove an entry from a database so that a user can no loner connect to the secondary communication system. This embodiment, also enables either a potential user, receptionist, or system manager to add an entry to the "registered user list" by undertaking a series of steps using a webpage that interacts with a database, to obtain access. As an example, the receptionist finds out that it is 5 pm and Ms. Jones is leaving the building as a visitor for the last authorized use. The receptionists logs into the database, removes the wireless device listing from the database as an individual, or as one of all visitors on Jun. 11, 2006, or as one of all visitors between 2-5 pm Jun. 11, 2006 or by some other specified filter. Conversely, a visitor wishes to use the AT&T service while in the AT&T building, and prior to that visit, logs onto the secure website, enters her name, address, and other security required information including the wireless device number, and the website communicates with a database that communicates with the secondary communication system. A number is generated by the server or another processor of the communication system enabling the user to be coded into the database and preauthorized to use the system once the user enters the AT&T building. The database is very important for data management of all visitors and user of the system, particularly for billing purposes.

Even with the database embodiment, it is contemplated that an APSA port would be usable for radiating access and communication channel signals within a limited spatial constraint at a level exceeding a signal level of the access and communication channels of the dominant communication system and in that limited spatial constraint, the secondary communication system could receive signals from the wireless devices for activation in the secondary Ethernet-like wireless communication system.

Yet another method is contemplated in the embodiments, that is, a method of activating, associating, and authenticating a wireless device in a secondary Ethernet-like wireless communication system co-located with a primary Ethernet-like wireless communication system, by masking the signal strength associated with the primary Ethernet-like wireless communication system and then coupling signals of the secondary Ethernet-like wireless communication system to the wireless device during the masking. In effect, this method is a method that jams the signals of the dominant communication systems. Usable jamming devices would be subject to rules regulating use of such masking devices (e.g. FCC). Examples of such devices are those designed for small-area jamming/masking of GSM signals (e.g. in secure areas). Examples of such devices (for cellular frequencies) are Models CJ7, CJ7A, CJ8A, CJ9A, CJ10A sold by Antenna Systems & Solutions, Inc., 931 Albion Avenue, Schaumburg of Illinois 60193, USA.

In this embodiment, the masking of the signal strength involves devising a signal of the secondary Ethernet-like wireless communication system that exceeds in magnitude the signal strength of the primary Ethernet-like wireless communication system as masked within defined spatial limits; and then the wireless device would be operated for activation purposes within the defined masked spatial limits.

The methods and systems of the embodiments can be used with any two dominant and secondary systems that coexist together. It is contemplated that this embodiment can be used with public Ethernet-like wireless communication systems co-located with private or localized Ethernet-like wireless communication systems. It is contemplated, particularly for the masking embodiment, that this method is usable for signals that are on identical channels between the dominant and secondary communication system, (or public and private communication system).

An additional embodiment contemplates that the user can opt-out of the secondary Ethernet-like wireless communication system at any time.

The embodiment contemplates that the signals of the dominant communication system facilitate activation scenarios for an interaction with co-located Ethernet-like wireless communication systems.

It is also contemplated that the masking embodiment can be used to blocking radiation of a higher signal strength within a limited space at which the wireless device connects.

Masking can be directionally controlling signal radiation of the secondary Ethernet-like wireless communication system.

The embodiments also contemplate a method of accessing and achieving authentication from a secondary Ethernet-like wireless communication system in a region overlapped by a dominant Ethernet-like wireless communication system, by creating an access and communication signal space in which radiated access and communication signal levels of the secondary Ethernet-like wireless communication system within the access and communication signal space exceed access and communication signal levels of the dominant Ethernet-like wireless communication system. In that superseded area, the wireless device can seek access and communication to the secondary Ethernet-like wireless communication system, receive a search from the wireless device to locate the strongest channel; select the channel of the secondary Ethernet-like wireless communication system within the limited space; obtain authorization and authentication information for the wireless device operating within the secondary Ethernet-like wireless communication system.

This method enables the secondary Ethernet-like wireless communication system to interwork with the dominant Ethernet-like wireless communication system.

Additionally, this method contemplates that billing service can occur while in the secondary Ethernet-like wireless communication system through the dominant Ethernet-like wireless communication system.

In still another embodiment of this method, it is contemplated that the wireless device can receive credentials associated with the wireless device and the secondary Ethernet-like wireless communication system information in advance of accessing the secondary Ethernet-like wireless communication system for allowing administration of services within the secondary Ethernet-like wireless communication system.

In a variation of the disclosed embodiments a secondary/microcellular system may be interconnected with the dominant/macro cellular system so that the two interwork with each other. In a particular aspect an inter/intranet-connected database may be utilized by both systems. Such a database may be readily accessed by individuals requesting access to the secondary system through an internet/intranet connection. Such a database could be used to provide mobile station phone numbers and additionally provide other service provider information.

A secondary, wireless communication system 100 is illustrated in FIG. 1. System 100 is considered to be overlapped (i.e., in an area covered by radiated signals of another dominant system) by a public or dominant Ethernet-like communication system having operative and access signal much higher in signal strength than used by the system 100.

The overlapping systems are considered to be primarily digital with some being analog. They may operate according to TIA/EIA-136, IS-95, IS-54, EDGE or other standards. The secondary and possibly private system 100 is considered to be an embodiment operating under an TIA/EIA-136 standard although it is to be noted that the embodiment contemplates operation under other standards (e.g., including GSM, DECT, etc). Due to the high signal strength of the dominant system the user of a wireless device is unable to connect to the secondary system 100.

A controller 101 directs operation of the secondary wireless system. The controller includes a Network Service Platform (NSP) 102, a database 103 and a digital switch 104.

Controller 101, with its functional sub-units, performs such functions as digital switching and network operations. These network operations include set-up operations, feature applications, maintain a subscriber database, operate security functions, fault detection and resolution, and RF management functions.

NSP 102 is a server, which with its associated database 103 provides operational rules and regulations and monitors/identifies the various usage/users.

Two wireless devices 107 and 108 operating within the private wireless communication system 100. VAP 105 is connected to the digital switch 104 via a line interface, which could be an ISDN/BRI connection, a 10Base T connection or any other standard telephone lines (e.g., POTS). VAP 106 is likewise connected to the digital switch 104 via an ISDN/BRI connection, a 10Base T connection, or any other standard telephone lines (e.g., POTS). VAP stands for Voice Access Port. POTS stands for Plain Old Telephone System.

The VAPs are assumed to be small (i.e., miniature) base stations operating similarly (i.e., in principle) to those of public wireless communications systems. In the illustrative embodiment the controller is co-located with the operative area within the radiation area of the private/secondary system.

The ISDN (Integrated Services Digital Network) connection conforms to a set of standards for digital transmission over copper wire and other transmission media. The suggested service level is the BRI (Basic Rate Interface) level intended for small private users and includes two B (bearer) channels (64 Kbps) and one D (delta) channel (16 Kbps). 10base-T is a carrier medium connection (e.g., twisted pair wire) used by many Ethernet systems operating at 10 Mbps. Since the aforementioned transmission media are well known to those skilled in the art no further description is believed necessary.

The digital switch 104 is connected to a Local Digital switch 110, which handles digital signals passed to and from digital switch 104. LDS 110 may be a public server located at a central office or on customer premises. These various server arrangements are well known in the art and need not be discussed in detail. Various Ethernet-like devices 115 may be connected to LDS 110. A trunk 109 connects LDS 110 to a public network 114.

Automatic Private Service Activation (APSA) device 125 is shown connected to the controller 101. APSA 125 is essentially a miniature base station of the local system 100 which has been modified to permit a wireless device to communicate with the controller under an arrangement where this connection is masked/shielded from the radiation of the dominant system.

Figure 3:
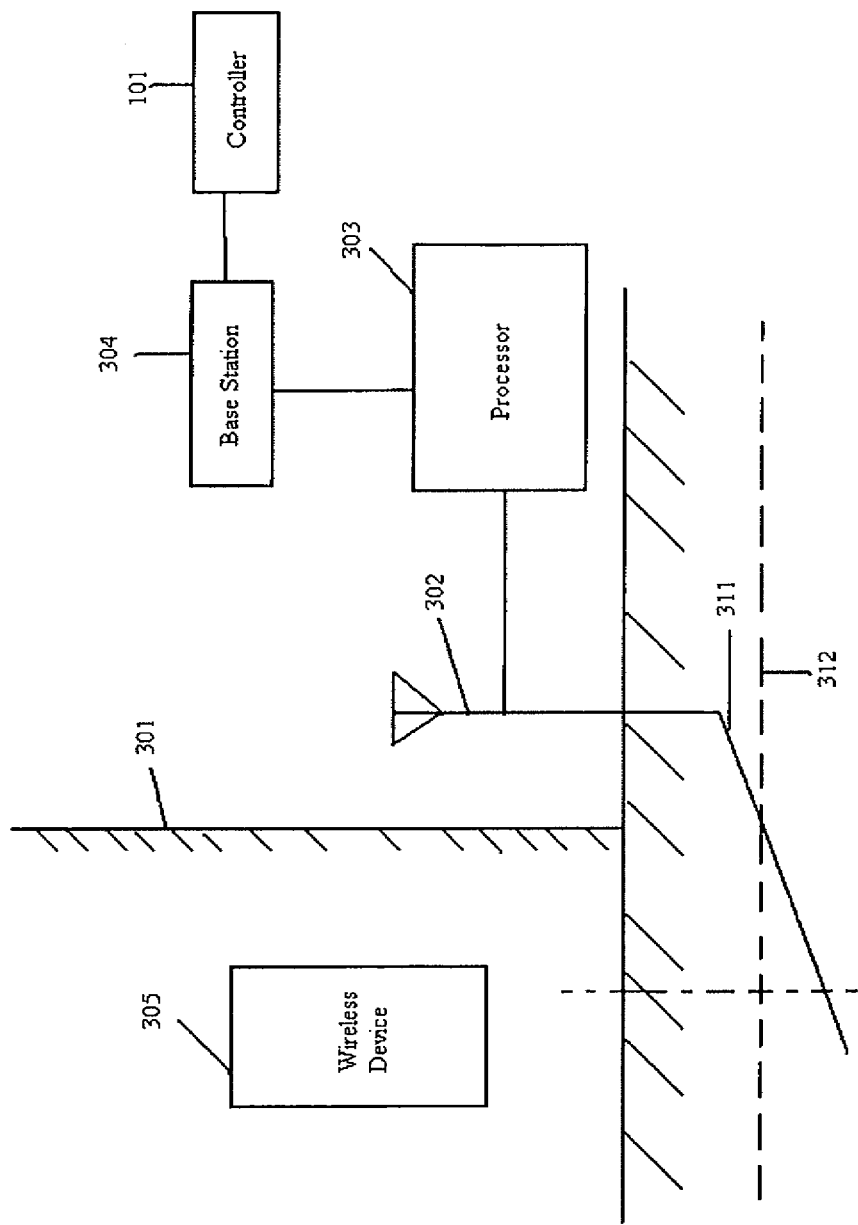
FIG. 3 is a view of an antenna arrangement used for access in a secondary system.
Figure 4:
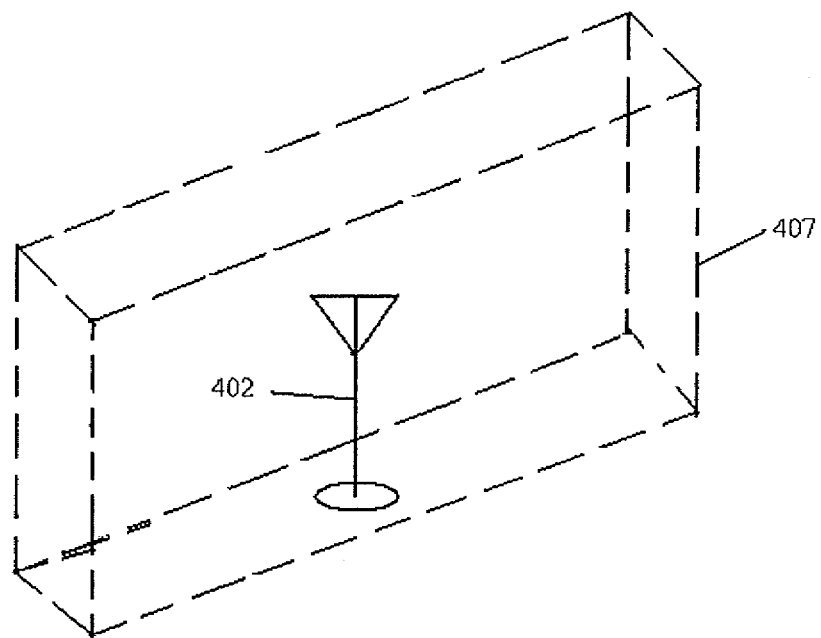
FIG. 4 is a view of another antenna arrangement usable in the embodiments.

In the embodiment the APSA device radiates a digital signal which is in the same frequency range as such signal allotted to the primary communications system overlapping the secondary system served by APSA 125. Suggested shielding/masking techniques are illustrated in FIGS. 3 and 4.

In the embodiment, this miniature base station is an Ethernet-like base station, such as a server.

The APSA 125 and VAP's 105 and 106, in the embodiment, are miniature base stations and have capability for communicating with the wireless device using digital signals. These stations may have multiple channel capability allowing transmission and reception on several channels simultaneously allowing differing modulation and channel-coding techniques. As shown in the FIG. 1 they may be connected to a switch, or a controller including a switch, by standard line interfaces (e.g., ISDN BRI, ISDN PRI, 10Base T, Trunk/PRI, etc).

The APSA 125 may be located at an entrance or on the periphery or a combination thereof of the operating extent of the secondary communication system. It may operate in an enclosed area (e.g., entrance lobby) or in an enclosure, (like a mini-microwave like device) which is exposed to the environment.

If located at an entrance it may be combined with a premise admittance system, which also responds to wireless smart badges used for entry authentication. The transmission power of the digital access signals are set at a level so that access procedures must be performed with the wireless handset located within a tightly defined space (i.e., normally within inches of the APSA antenna)

An APSA 125 operating environment is illustrated schematically in FIG. 3. This embodiment presents the wireless device user with a surface 301, which the wireless device 305 is placed against, according to provided instructions. The ASPA antenna is located just behind the surface, which is transparent to electromagnetic radiation in the illustrative embodiment. The distance and signal strength radiated by the antenna 302 is selected so that the field strength presented to the wireless device at the surface 301 exceeds the radiated signal strength of the overlapping primary or dominant system. The signal strength of the secondary system radiation exceeds the ambient field strength of the dominant system at distances very close to the antenna of the secondary system.

The antenna 302 is connected to circuitry 303, which in turn is connected, to the base station equipment 304. This in turn is connected to the controller 101. The APSA 125 is advantageously located at some location easily accessed by potential new users of the secondary system. Such location might be an entrance to a building containing the secondary system. Other locations will suggest themselves to those skilled in the art.

An alternative arrangement is illustrated in the schematic of FIG. 4, in which the secondary system access antenna 402 is shielded from ambient radiation of the dominant system. In the embodiment of FIG. 4 the shielding mechanism is a box 407, much like a microwave oven, surrounding the antenna 402 to prevent/reduce the level of ambient radiation of the dominant communication system within the box. Within the box 407 the wireless device may interact solely with the secondary system antenna 402 independent of radiation of the dominant system.

Alternative arrangements may use an external antenna having highly directional radiation constructs to permit access despite the radiant level of the dominant system. This arrangement may be useful if the antenna and APSA circuitry are not co-located or other placement restrictions exist.

Figure 2:
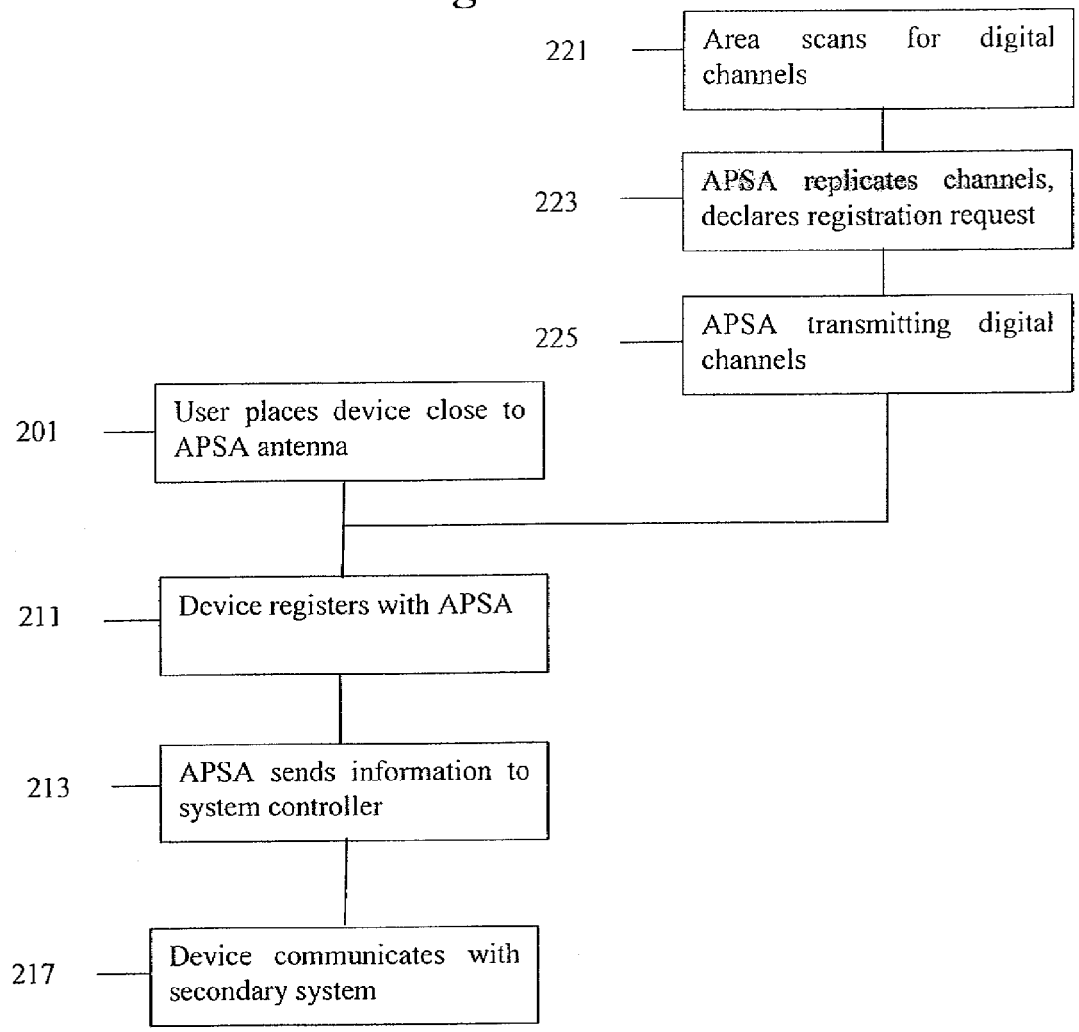
FIG. 2 is a flow chart of a process by which a wireless device accesses and is authenticated by the wireless communication system of FIG. 1.

A flow chart illustrating the method is presented in FIG. 2. This process is based on continuing signal activity of an active secondary communication system. As indicated in block 221 the APSA base station continually scans for channels of a dominant communications system. These signals, as per block 223, are replicated by the APSA for receiving registration requests. The APSA transmits these replicated signals, as per block 225, as digital channels on the same frequencies used in the dominant communication system.

The activation/access process in initiated when the user places a handset (i.e., wireless telephone) close to an APSA antenna, as per block 201. Registration is achieved with the APSA per block 211.

The APSA communicates with the System controller of the secondary system per block 213. The device is enabled for communication with the secondary system per block 217.

The service portion of this embodiment utilizes an intranet-based application program to communicate with the private system controller in packet format. In a fully automatic instantiation, the controller receives the handset's MIN and ESN from the APSA unit, and may interact and/or update an authentication database to admit the new user. Such updates could conform to one of several service scenarios, depending on the strength of access privileges, which may be deemed appropriate. The following are examples, but one skilled in the art will recognize that other levels are possible:

1. Verify that the user is a member of the organization, which sponsors the private user community via access to a corporate database. Such users may be granted unlimited period of access with full privileges.

2. Identify the user as an invited visitor to the organization who wishes to access the system for a limited period of time and with either unlimited or limited privileges. In this case, security attendant intervention would be required to authorize access and active period. This operation could be accommodated by an Intranet application page available at the security attendant's location.

3. Identify the user as a dominant communication system subscriber (by accessing the dominant communication system subscriber database) who will be allowed to access the system in order to achieve improved service in the building, but whose service will be billed through the dominant communication system's subscription.

4. Identify the user as having emergency only (911) authorization while in the building.

Alternatively, an Internet-connected database accessible directly by individuals requesting in-building service could permit insertion of mobile phone number and service provider information in advance (with appropriate security firewalls). Access to this database would allow self-administration of services within the building, either for a fee or for no-charge use. As an example of a situation where such a service would be useful is at a hotel or airline preferred-customer club. The access could be in the form of receiving credentials associated with the wireless device.

Following user validation, via the designated database(s), the controller interworks with the APSA unit to transmit a System ID Message (PSID). This message, working with software in the wireless device, installs the PSID into the Number Assignment Module (NAM) memory area. The wireless device is programmed with a new Private SID, it preferentially locks onto the DCCH of the private system.

This embodiment could also be used to provision users in a particular local environment, such as malls, attractions, and conventions. Such service would allow calls to be handled by a private cellular environment separately from the public or dominant system. Such applications could provide different call charges, special features or allow access to other systems operating in service area, such as at an international airport). In these instances, a Residential SID may be used instead of the Private SID, but other procedures remain the same.

While these embodiments have been described with emphasis on the embodiments, it should be understood that within the scope of the appended claims, the embodiments might be practiced other than as specifically described herein.

What is claimed:

1. A secondary wireless communication system overlapped by a first wireless communication system, comprising:
    an automated private service activation port for accepting access and communication requests of a wireless device seeking activation, association and authentication in the secondary wireless communication system, the automated private service activation port providing:
        an access and communication channel for radiating signals at a level exceeding a signal level of an access and communication channel; and
        a space for receiving the wireless device for activation and communication in the secondary wireless communication system.

2. The secondary wireless communication system of claim 1, further comprising:
    the automated private service activation port being part of a cellular base station having digital communication channels which operate under an institute of electrical and electronics engineers 802.11 standard.

3. The secondary wireless communication system of claim 2, further comprising:
    a surface covering an antenna for abutting against and communicating with the wireless device at a signal level sufficient to achieve access, association, and authentication, and exceeding at the surface a signal level of the first wireless communication system that overlaps the secondary wireless system.

4. The secondary wireless communication system of claim 2, further comprising:
    a surface covering an antenna for access and communication to a wireless device seeking access, association, and authentication, and including shielding for blocking a signal level of the first wireless communication system that overlaps the secondary wireless system.

5. The secondary wireless communication system of claim 1, further comprising:
    the automated private service activation port being part of a cellular base station having digital communication channels which operate under an institute of electrical and electronics engineers 802.16 standard.

6. The secondary wireless communication system of claim 5, further comprising:
    a surface covering an antenna for abutting against and communicating with a wireless device at a signal level sufficient to achieve access, association, and authentication, and exceeding at the surface a signal level of the first wireless communication system that overlaps the secondary wireless system.

7. The secondary wireless communication system of claim 5, further comprising:
a surface covering an antenna for access and communication to a wireless device seeking access, association, and authentication and including shielding for locking a signal level of the first wireless communication system that overlaps the secondary wireless system.

8. The secondary wireless communication system of claim 1, further comprising:
a system controller for providing digital switching and service features connected to the automated private service activation port via an ethernet interface.

9. The secondary wireless communication system of claim 8, wherein the system controller comprises a network service platform for providing a service and management function.

10. A method of communication for achieving association, authentication and access, from a secondary wireless communication system in a region overlapped by a first wireless communication system, comprising:
creating access, association, and authentication in a signal space in which radiated access and communication signal levels of the secondary wireless communication system within the signal space exceed access and communication signal levels of the first wireless communication system;
positioning a wireless device seeking access, association, and authentication and communication within the signal space and powering up the wireless device;
searching by the wireless device for a strongest channel;
selecting the strongest channel of the secondary wireless communication system by reason of the positioning of the wireless device within the signal space; and
authorizing, authenticating, and associating the wireless device for operation within the secondary wireless communication system.

11. The method of claim 10, further comprising:
enabling the secondary wireless communication system to interwork with the first wireless communication system; and
authorizing, associating, and authenticating in accordance with an institute of electrical and electronics engineers standard.

12. The method of claim 10, further comprising:
authorizing, associating, and authenticating based on information retrieved from a database of the first wireless communication system to enable a billing of service through a subscription to the first wireless communication system.

13. The method of claim 10, further comprising:
authorizing, associating, and authenticating to use a wireless device identifier code, wherein the wireless device identifier code is inserted into the wireless device at an initial authorization and authentication, and wherein the wireless device identifier code is unique to the secondary wireless system so that at a post initial authorization and authentication, the wireless device locks on to the secondary wireless communication system.

14. The method of claim 13, further comprising:
operating the wireless device in the secondary wireless system in substitution for the first wireless communication system.

15. A method of activating and authenticating a wireless device of a new user in a secondary wireless communication system in a region overlapped by a first wireless communication system, comprising:
enabling, by a processor, the activating and authenticating within a limited sub-region of the region overlapped by the first wireless communication system and within the limited sub-region including:
providing access credentials from an automatic private service activation unit of the secondary wireless communication system; and
interacting with a database containing user credentials, and user requested features, to provide a record and to enable service to the new user.

16. The method of claim 15, further a comprising:
installing in the wireless device, a private system identification number.

17. A method of activating, associating, and authenticating a wireless device in a secondary wireless communication system co-located with a primary wireless communication system, comprising:
masking, by a processor, a signal strength associated with the primary wireless communication system; and
coupling, by the processor, signals of the secondary wireless communication system to the wireless device during the masking.

18. The method of claim 17, wherein the masking of the signal strength comprises devising a signal of the secondary wireless communication system so that it exceeds in magnitude a signal strength of the primary wireless communication system as masked within defined spatial limits; and
operating the wireless device for activation purposes within the defined spatial limits.

19. The method of claim 18, further comprising:
using a cellular base station having digital communication channels which operate under an institute of electrical and electronics engineers standard.

20. The method of claim 19, wherein the secondary wireless communication system is a private local communication system.

* * * * *